(12) United States Patent
Ishida

(10) Patent No.: US 6,574,704 B1
(45) Date of Patent: Jun. 3, 2003

(54) INFORMATION STORAGE MANAGEMENT DEVICE AND METHOD, CONTROL DEVICE AND METHOD

(75) Inventor: Akiya Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 09/593,950

(22) Filed: Jun. 19, 2000

(30) Foreign Application Priority Data

Jun. 23, 1999 (JP) ............................................ 11-177057

(51) Int. Cl.[7] .............................................. G06F 13/14
(52) U.S. Cl. ...................................................... 711/114
(58) Field of Search ................................ 711/114, 117, 711/161, 162

(56) References Cited

U.S. PATENT DOCUMENTS 5,933,653 A * 8/1999 Ofek .......................... 395/826
6,304,980 B1 * 10/2002 Beardsley et al. ............. 714/6

* cited by examiner

*Primary Examiner*—Kevin L. Ellis
(74) *Attorney, Agent, or Firm*—Bell, Boyd & Lloyd LLC

(57) ABSTRACT

An information storage management device and method are proposed in which the utility and the facility can be remarkably improved. A control device and method are proposed which are capable of improving remarkably the utility and the facility of the information storage management device for storing and managing information. The information storage management device and method are capable of dividing the first storage area into the second plural storage areas in response to the first request from the exterior, and capable of writing information in each of the second storage areas. The controlling device and method are for controlling the writing component so as to cause it to divide the first storage area into the second plural storage areas in response to the first request from the exterior, and to write information in each of the second storage areas.

14 Claims, 9 Drawing Sheets

| SURFACE ID | | | | | |
|---|---|---|---|---|---|
| MEDIA ID | | | | | |
| MEDIA SET ID | | | | MD$_{ms}$ | |
| VOLUME POOL ID | SET NUMBER | MEDIA SERIAL NUMBER | SURFACE NUMBER | MEDIA TYPE | PRELABELED ID |
| 2000289 | 001 | 001 | 0 | MO 1.3G | AAA5248 |
| | | | 1 | MO 1.3G | AAA5248 |
| | | 002 | 0 | MO 1.3G | AAA5248 |
| | | | 1 | MO 1.3G | AAA5248 |
| | | 003 | 0 | MO 1.3G | |
| | | | 1 | MO 1.3G | |
| | | ... | ... | ... | |
| | 002 | 001 | 0 | CD-R 650M | |
| | | 002 | 0 | CD-R 650M | |
| | | ... | ... | ... | |
| | 003 | 001 | 0 | DVD 5G | |
| | | ... | ... | ... | |

| FILE NAME | SURFACE ID AND ADDRESS |
|---|---|
| A | HDD··············<br>20002890010010···<br>20002890020020···<br>20002890030030··· |
| B | 20002890010021···<br>20002890020020···<br>20002890030010··· |
| ⋮ | ⋮ |

INFORMATION STORAGE MANAGEMENT DEVICE AND METHOD, CONTROL DEVICE AND METHOD

BACKGROUND OF THE INVENTION

1. Field of the Invention

This invention relates to an information storage management device and method as well as a control device and method, and more particularly, is suitably applied to, for instance, a hierarchical storage management (HSM) system for storing and managing data hierarchically.

2. Description of the Related Art

Heretofore, a hierarchical storage management system is constructed so as to store and retain data by means of a first storage media such as a hard disk which has a quick access time and a second storage media such as a magnet optical (MO) disk and a compact disk-recordable (CD-R) which have slower access time, hierarchically, in accordance with the frequency of their usage.

By the way, it has considered that if multiplexing of data (storing and retaining data doubly or triply) and/or backing up data was performed easily when necessary in such a hierarchical storage management system, the utility and the facility of the hierarchical storage management system would be improved.

SUMMARY OF THE INVENTION

In view of the foregoing, an object of this invention is to provide an information storage management device and method by which the utility and the facility can be remarkably improved, as well as a control device and method which remarkably enhance the utility and the facility of the information storage management device for storing and managing information.

The foregoing object and other objects of this invention have been achieved by the provision of an information storage management device comprising: controlling component for dividing the first storage area into the second plural storage areas in response to the first request from the exterior; and for controlling the first writing component so as to write information in each of the second storage areas. As a result of this, in this information storage management device, multiplexing of information can be performed easily at the time when it is needed.

Further, the present invention provides an information storage management method comprising the steps of: dividing the first storage area into the second plural storage areas in response to the first request from the exterior; writing information in each of the second storage areas. As a result of this, in this information storage management method, multiplexing of information can be performed easily at the time when it is needed.

Furthermore, the present invention provides a control device comprising controlling component for dividing the first storage area into the second plural storage areas in response to the first request from the exterior, and for controlling the writing component so as to write information in each of the second storage areas. As a result of this, according to this control device, multiplexing of information can be performed easily at the time when it is needed.

Moreover, the present invention provides a control method comprising the steps of dividing the first storage area into the second plural storage areas in response to the first request from the exterior; controlling the writing component so as to write information in each of the second storage areas. As a result of this, according to this control method, multiplexing of information can be performed easily at the time when it is needed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a conceptual diagram showing the media set management database;

FIG. 4 is a conceptual diagram showing the file management database;

DETAILED DESCRIPTION OF THE EMBODIMENT

Figure 1:
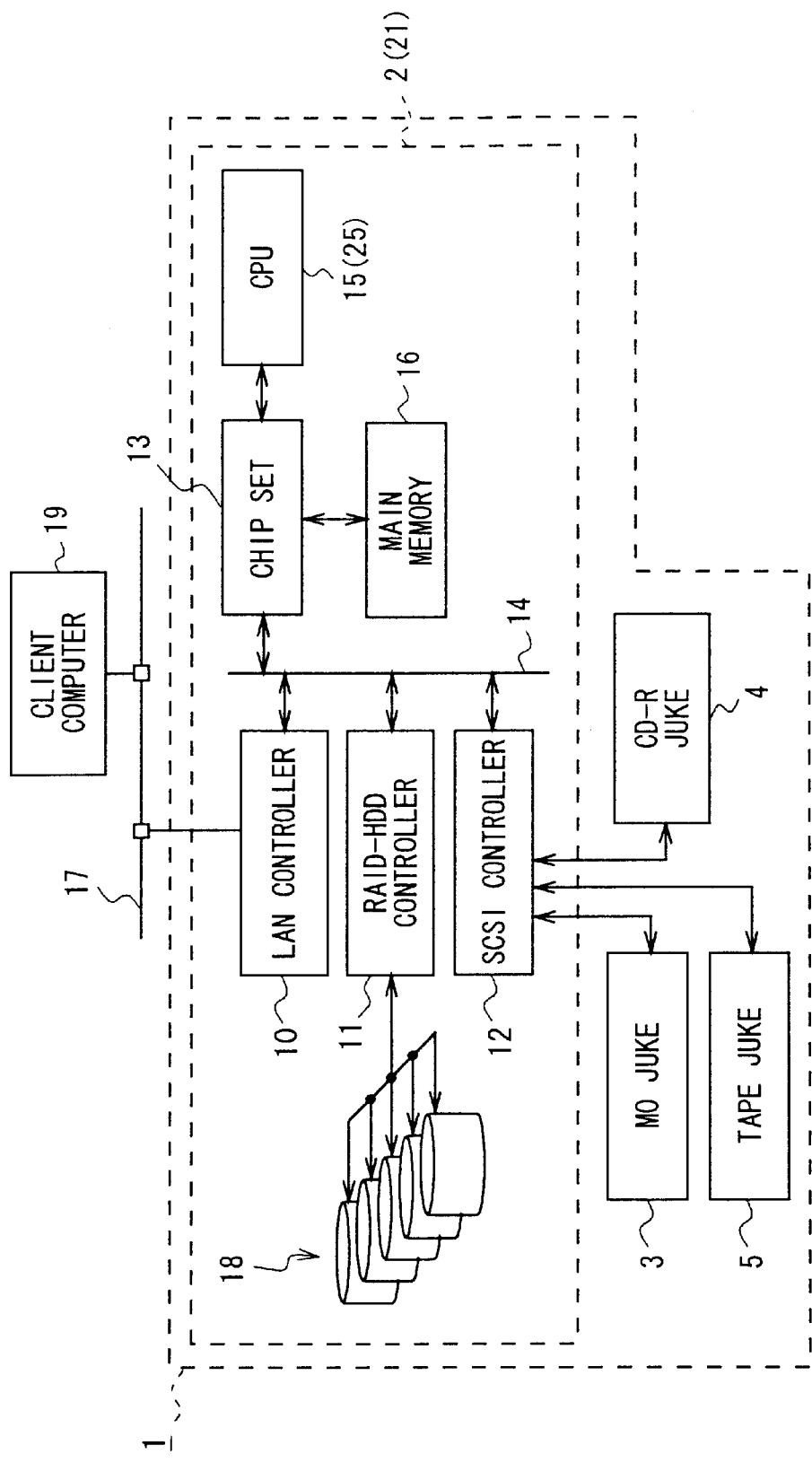
FIG. 1 is a block diagram showing a configuration of the hierarchical storage management system according to the first embodiment.
Figure 2:
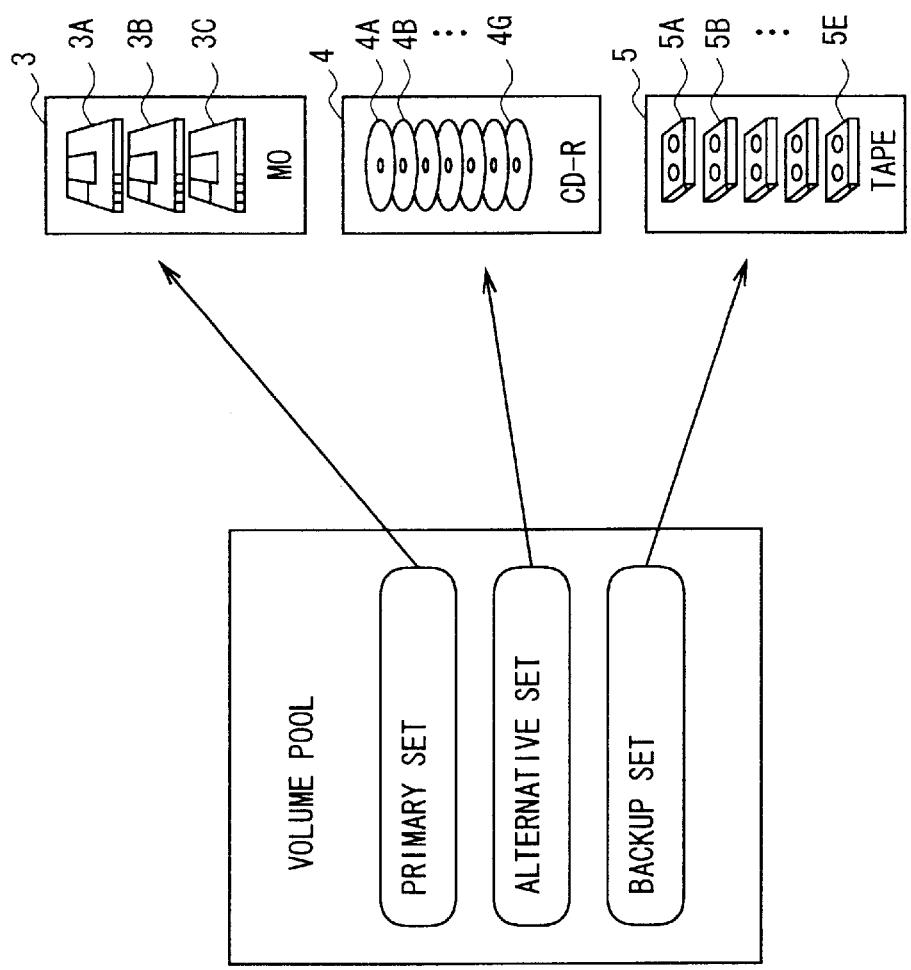
FIG. 2 is a conceptual diagram used for explaining management of the storage area by the use of "media set"

Preferred embodiments of this invention will be described with reference to the accompanying drawings:

(1) First Embodiment (1-1) Configuration of Hierarchical Storage Management System of First Embodiment Referring to FIG. 1, a hierarchical storage management system of the first embodiment generally designated as 1 is comprised of a hierarchical storage management unit 2 and plural jukes 3 to 5; the plural jukes 3 to 5 include respectively plural magnet optical (MO) disks, compact disk-recordable (CD-Rs), or magnetic tapes (hereinafter, these are referred to as removable media, collectively), which have been connected to the hierarchical storage management unit 2.

In this case, the hierarchical storage management unit 2 is comprised of a local area network (LAN) controller 10, a redundant array of inexpensive disks (RAID)—hard disk drive (HDD) controller 11, a small computer system interface (SCSI) controller 12 and a chip set 13 which are mutually connected via a peripheral component interconnect (PCI) bus 14, as well as a central processing unit (CPU) 15 and a main memory 16 which are connected to the chip set 13.

Besides, the hierarchical storage management unit 2 is connected to an Ethernet 17 via the LAN controller 10, and connected to a RAID unit 18 via the RAID—HDD controller 11, and also connected to each of jukes 3 to 5 via the SCSI controller 12.

And, the hierarchical storage management unit 2 would take variety of commands which are given from a client computer 19 via the Ethernet 17 in the CPU 15 via the LAN controller 10 and the chip set 13 in sequence; in response to the commands, the CPU 15 would control the RAID unit 18 via the RAID—HDD controller 11 and/or control the required jukes 3 to 5 via the SCSI controller 12; in this way, the system is enabled to execute the operation which is corresponding to the commands, as a whole.

For instance, when file data have been given from the client computer 19 via the Ethernet 17, the CPU 15 would control the LAN controller 10, the RAID unit 18 and others so as to cause the RAID unit 18 to take in the file data and to cause the hard disk to record the file data.

At this time, in the case where the quantity of data storage in the RAID unit 18 has become full, the CPU 15 would control the RAID unit 18 and the corresponding jukes 3 to 5 so as to cause them to copy the file data whose access frequencies are low into the removable media in the corresponding jukes 3 to 5, and then delete the very file data from the RAID unit 18; in this way, it would free up storage area for the newly supplied file data within the RAID unit 18.

Besides, if the CPU 15 has taken file data within the RAID unit 18 from the exterior, then the CPU 15 controls the RAID unit 18 and the corresponding jukes 3 to 5, at the stated timing, in a manner so as to cause them to copy the very file data from the hard disk in the RAID unit 18 into the removable media in the corresponding jukes 3 to 5.

On the other hand, if a read request command of file data has been given from the client computer 19 via the Ethernet 17, the CPU 15 controls and causes the RAID unit 18 and the LAN controller 10 to read the corresponding file data from the hard disk in the RAID unit 18 and to send out this data to the client computer 19 via the Ethernet 17.

Besides, if the file data of which read request has been given at this time do not exist in the RAID unit 18, the CPU 15 controls the RAID unit 18, the LAN controller 10 and any one of the jukes 3 to 5, so as to copy the file data which are recorded on the removable media in the very juke 3 to 5 into the hard disk in the RAID unit 19, and to send out this data to the client computer 19 via the Ethernet 17.

Thus, the hierarchical storage management system 1 is arranged in a manner so as to perform hierarchical storage management of file data which are given via the Ethernet 17, and to read the very file data stored and managed in response to the request from the client computer 19.

(1-2) Management of Storage Area in Hierarchical Storage Management System 1

At here, the CPU 15 of the hierarchical storage management unit 2 manages the whole storage area of the hierarchical storage management system 1 dividing it into logical frameworks of plural "volume pools".

In this case, one "volume pool" is comprised of a part of the storage area of the hard disk in the RAID unit 18 and a part of the storage area which is formed by whole removable media in each juke 3 to 5. Therefore, "volume pool" is a unit of hierarchical storage management in the hierarchical storage management system 1.

Besides, in response to the request from the client computer 19, with respect to the specified "volume pool", the CPU 15 creates and sets logical frameworks (hereinafter, this is referred to as "media set") for further fragmentation and management of the storage area which is formed by whole removable media allocated to the very "volume pool". In this embodiment, three "media sets" can be created and set, that is, a primary set, an alternative set and a backup set.

In this case, a primary set is a "media set" which can be set to all "volume pools" basically, and comprised of the storage area for storing whole file data which have been taken in the RAID unit 18 from the exterior and the management data for managing this.

Besides, an alternative set is a "media set" which is additionally created at the time when it is desired to multiplex the file data in the primary set with respect to the "volume pool" to which only primary set has been set, and comprised of the storage area for multiplexing whole file data in the primary set and storing it and the management data for managing this.

Moreover, a backup set is a "media set" which is created at the time when the backup of the "volume pool" is performed, and comprised of the storage area for performing backup of whole file data which is stored in the RAID unit 18 and whole file data in the other "media set" and the management data for managing this.

And, in this embodiment, the storage area of the MO disk 3A to 3C which has been allocated to the "volume pool" is assigned for the storage area of the removable media of the primary set, and the storage area of the CD-R 4A to 4G which has been allocated to the "volume pool" is assigned for the storage area of the alternative set, and the storage area of the magnetic tape 5A to 5E which has been allocated to the "volume pool" is assigned for the storage area of the backup set. However, the user is able to perform assignment of the storage area to each "media set" freely, in units of a separate removable medium.

Besides, in this embodiment, it is possible to perform multiplexing of the file data in the primary set by the use of the backup set, and also possible to perform multiplexing by the use of the alternative set.

That is, the reason why the names such as "alternative" and "backup" have been given to the respective "media sets" is merely for convenience of the user who employs the graphical user interface (GUI) of the client computer 19, and there is not any functional difference between the alternative set and the backup set.

Besides, the CPU 15 gives each "volume pool", each "media set", each removable medium which has been respectively allocated to each "media set", and each recording surface of each removable medium the respective their own identification IDS or numbers, as shown in FIG. 3.

As a result of this, a media set ID for identifying each "media set" is created, on the basis of a volume pool ID, and a set number which has been given to each "media set"; a volume pool ID is comprised of the ID of the "volume pool" which is created from the ID that has been given to the hierarchical storage management unit 2, the creation time, and others.

Besides, on the basis of this media set ID, and a serial number which has been given to each removable medium in the "media set", a media ID for identifying each removable medium is created. Besides, on the basis of this media ID, and a surface number which has been given to the recording surface of a removable medium, a surface ID is created.

On the basis of this surface ID, the CPU 15 then creates a media set management database DB1 shown in FIG. 3, and manages each "media set" on the basis of the media set management database DB1.

In this connection, "Prelabeled ID", shown in FIG. 3, is an identification ID of each removable medium which has been given to a specific removable medium at the time of factory shipping, and which has been recorded in the very removable medium as the data. Besides, that which is a blank field shows a removable medium which has not been given any "Prelabeled ID" and which is sold in a general retail store.

Moreover, for each "volume pool", the CPU 15 creates a file management database DB2 showing recorded positions of the respective file data, shown in FIG. 4 as an example, by the use of a surface ID which is created as stated above, and manages recorded locations of the respective file data on the basis of this file management database DB2. In this connection, "HDD . . . . . ." in this FIG. 4 shows that the file data having the file name of "A" have been stored in the RAID unit 18 too.

(1-3) Multiplexing and Backup Functions Using "Media Set"

At here, a "media set" is capable of freely performing new creation, and separation from a "volume pool", and discarding.

For instance, in the case where a "media set" (an alternative set or a backup set) has been newly created, all file data in the "volume pool" are copied into the removable media which have been assigned to the "media set" that is newly created. Besides, in this case, various management data which are related to this newly created "media set" are registered on the media set management database DB1 shown in FIG. 3.

In this connection, various management data which are related to the newly created "media set" designate "set number", "media serial number", "surface number", "media type", and "Prelabeled ID" shown in FIG. 3; this management data is hereinafter referred to as media set management data $MD_{ms}$.

Moreover, in the case where a "media set" has been newly created, all file data which are taken from the exterior in this hierarchical storage management system 1 after that time are recorded on the removable media which have been assigned to the very "media set".

As a result of this, when an alternative set and/or a backup set have been created, all file data recorded on the removable media which have been assigned to the primary set would be recorded on also the removable media which have been assigned to the alternative set and/or the backup set, in this way, all file data in the very "volume pool" are multiplexed.

On the other hand, when a "media set" has been separated from a "volume pool", the "media set" comes into export treatment, and the media set management data $MD_{ms}$ of the very "volume pool" are deleted from the media set management database DB1 of the very "volume pool".

Besides, a "media set" which has been separated from a "volume pool" can be imported into the same hierarchical storage management system 1 or into the different hierarchical storage management system 1 (the media set management data $MD_{ms}$ can be taken in). However, when the exported "media set" has been imported into the same hierarchical storage management system 1, this "media set" is treated as a different "volume pool" from the original "volume pool".

And, it is possible to perform backup of a "volume pool", utilizing such separation of a "media set".

In practice, in such a state that an alternative set and/or a backup set have been created for instance, when the very alternative set or backup set is to be cut off for the purpose of backup use, all management data for performing the management of the "volume pool" (hereinafter, this is referred to as a volume pool management data) are recorded on the removable media which have been assigned to the "media set", and then the very "media set" is separated from the "volume pool" through an internal processing; wherein the whole management data (the volume pool management data) are comprised of the management data that are composed of the year/month/date of creation of the "volume pool" to which the very "media set" has belonged and/or the species of the "media set" which has been set to the very "volume pool" and the like (hereinafter, this is referred to as a volume pool data), the data of the media set management database DB1, the data of a place pointer for indicating the copied position (which position of which removable media) of the file data which have been read in the hard disk in the RAID unit, and the like.

Besides, when backup is to be performed in a state that an alternative set and/or a backup set have been not created, after a "media set" (an alternative set or a backup set) has been newly created in response to the command from the client computer, the above-mentioned volume pool management data are recorded on the removable media which have been assigned to the "media set", and then this "media set" is separated from the "volume pool" through an internal processing.

In this connection, in the case where a "media unit" has been thrown away, with regard to internal processing, the "media set" is separated from all removable media which have been assigned to the very "media set" through an internal processing, and the media set management data $MD_{ms}$ of the very "media set" are not imported but deleted from the media set management database DB1.

(1-4) Concrete Process of CPU 15

At here, the new creation process of a "media set" and the writing process of file data will be described, out of the processing of the above-mentioned CPU 15.

Figure 5:
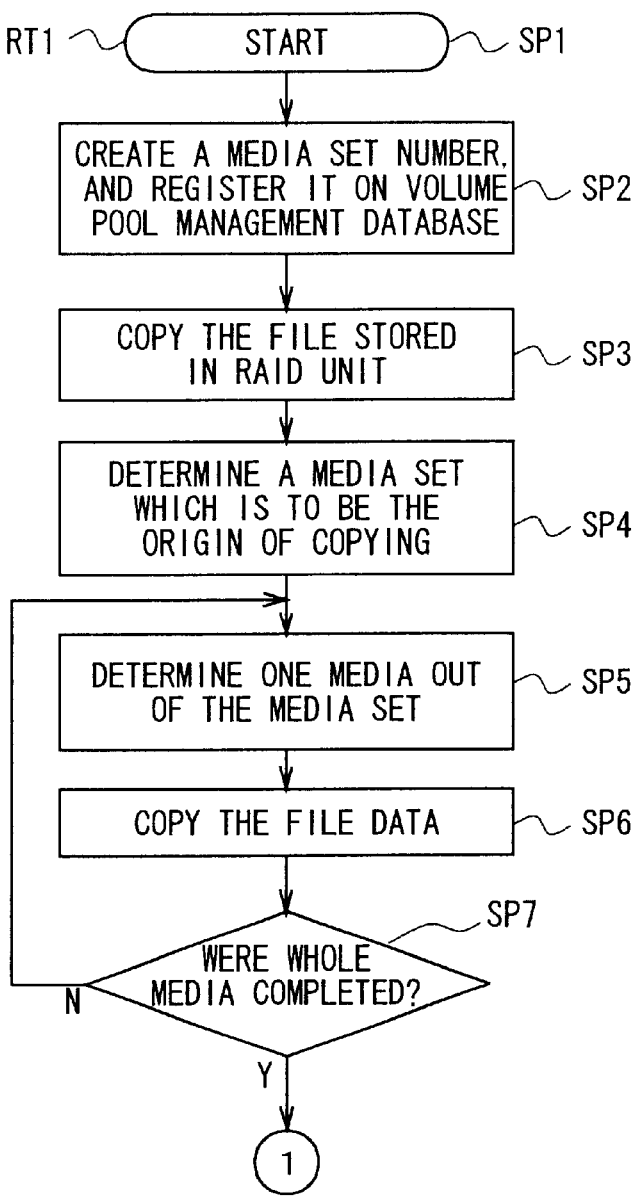
FIG. 5 is a flow chart showing the media set new creation procedure.
Figure 6:
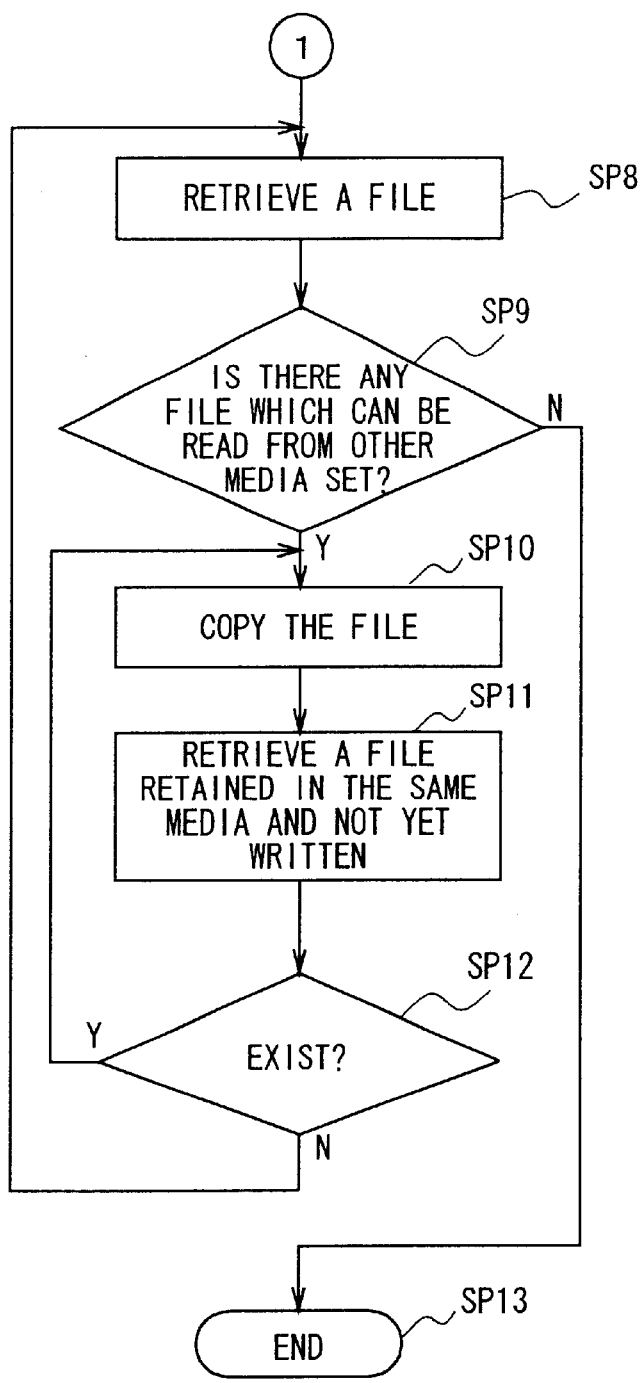
FIG. 6 is a flow chart showing the media set new creation procedure.

At first, the CPU 15 creates a "media set" afresh, in accordance with a media set new creation procedure RT1 shown in FIG. 5 and FIG. 6.

That is, when a command "create a 'media set' afresh" has been given from a client computer 19, the CPU 15 starts the media set new creation procedure RT1 at the step SP1, and then, at the following step SP2, generates a media set number which is larger by one than the maximum value of the media set number ("set number" in FIG. 3) which has been used until that time, and registers the very media set number on the media set management database DB1.

The CPU 15 then goes to the step SP3, and controls the RAID unit 18 and the corresponding juke 3 to 5 in a manner so as to cause them to copy the file data which have been stored in the RAID unit 18 into the removable media which have been assigned to the "media set" that is newly created.

Next, the CPU 15 goes to the step SP4, and, on the basis of the operational states of the file management database DB2 and each of jukes 3 to 5, searches the MO disks 3A to 3C, the CD-Rs 4A to 4G and the magnetic tapes 5A to 5E in this order, and determines one "media set" which is to be the origin of copying; then, it goes to the step SP5 and determines one removable media which is to be the origin of copying out of the respective removable media which have been assigned to the very "media set". In this connection, the determination of the removable media may follow the ascending order of the media serial number.

The CPU 15 then goes to the step SP6, and controls the respective jukes 3 to 5 of the origin of copying and the destination of copying, in a manner so as to cause them to copy the whole file data which have been recorded on the removable media which have been determined as the origin of copying in the jukes 3 to 5 which are the origin of copying into the removable media which are the destination of copying.

Moreover, the CPU 15 then goes to the step SP7, and judges whether copying has been completed or not of the whole file data which have been recorded on each removable media in the jukes 3 to 5 which have been determined as the origin of copying.

And, if the obtained result at this step SP7 is no, then the CPU 15 returns to the step SP5, and, after this time, repeats the loop of the steps SP5-SP6-SP7-SP5 until the affirmative result is obtained at this step SP7.

And, if the affirmative result has been obtained after all at the step SP7, then the CPU 15 goes to the step SP8 and controls the RAID unit 18 so as to read the file management database DB2; on the basis of the very file management database DB2, the CPU 15 retrieves a file which is stored in the other "media set" but not yet copied into a "media set" that is newly created.

Then, at the following step SP9, on the basis of the result of this retrieval, the CPU 15 judges whether there was any file which has been not yet copied into the newly created "media set" or not; if the obtained result is yes, the CPU 15 goes to the step SP10 and controls the corresponding juke 3 to 5 so as to copy the file data of the very file into the removable media which have been assigned to the "media set" that is newly created.

Moreover, the CPU 15 goes to the step SP11 after this, and retrieves a file which has been stored in the same "media set" and not yet copied into the "media set" newly created.

Then, on the basis of the result of this retrieval, the CPU 15 judges whether there is a file which has been not yet copied into the "media set" newly created or not, at the following step SP12.

And, if the obtained result at this step SP12 is yes, then the CPU 15 returns to the step SP10, and, after this time, repeats the loop of the steps SP10-SP11-SP12-SP10 until the negative result is obtained at the step SP12; in this way, the file data of all files which have been stored in the very "media set" and not yet copied are copied into the "media set" that is newly created.

And, if the negative result has been obtained after all at the step SP12, then the CPU 15 returns to the step SP8, and, after this time, repeats the loop of the step SP8 through the step SP12—the step SP8 until the negative result is obtained at the step SP9.

If the negative result has been obtained at the step SP9, then the CPU 15 goes to the step SP13, and ends this media set new creation procedure RT1.

Figure 7:
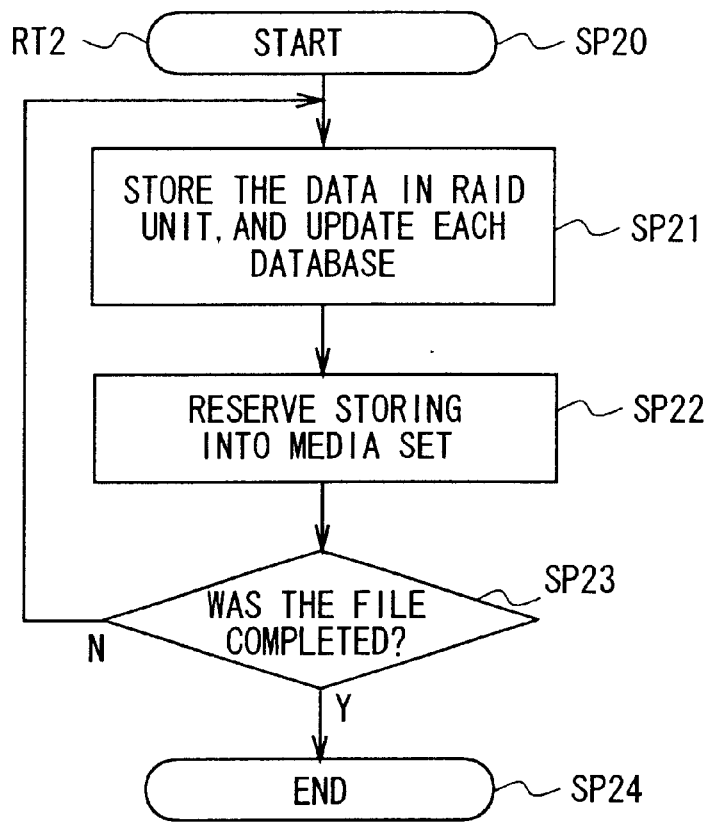
FIG. 7 is a flow chart showing the file data take-in procedure.

On the other hand, the CPU 15 causes the RAID unit 18 to take in the file data which are supplied via the Ethernet 17 in accordance with a file data take-in procedure RT2 which is shown in FIG. 7.

That is, when a write request command of the file data has been given from a client computer 19, the CPU 15 starts the file data take-in procedure RT2 shown in FIG. 7 at the step SP20.

And, at the following step SP21, the CPU 15 controls the RAID unit 18 in a manner so as to cause it to record the file data which are supplied from the client computer 19 on the hard disk in the very RAID unit 18, and also updates the file management database DB2 (FIG. 4) of the very "volume Pool" correspondingly.

Then, the CPU 15 goes to the step SP22, and reserves sending out of this file data toward each "media set" which has been set at that time; after this, the CPU 15 goes to the step SP23, and judges whether this writing process toward the file should be ended or not.

If the negative result is obtained at the step SP23, this fact means that the very file data is having much quantity of data and so it would be divided into several batches and sent, the CPU 15 returns to the step SP21, and, after this time, repeats the loop of the steps SP21-SP22-SP23-SP21 until the affirmative result is obtained at the step SP23.

If the affirmative result has been obtained at the step SP23, then the CPU 15 goes to the step SP24, and ends this file data take-in procedure RT2.

Figure 8:
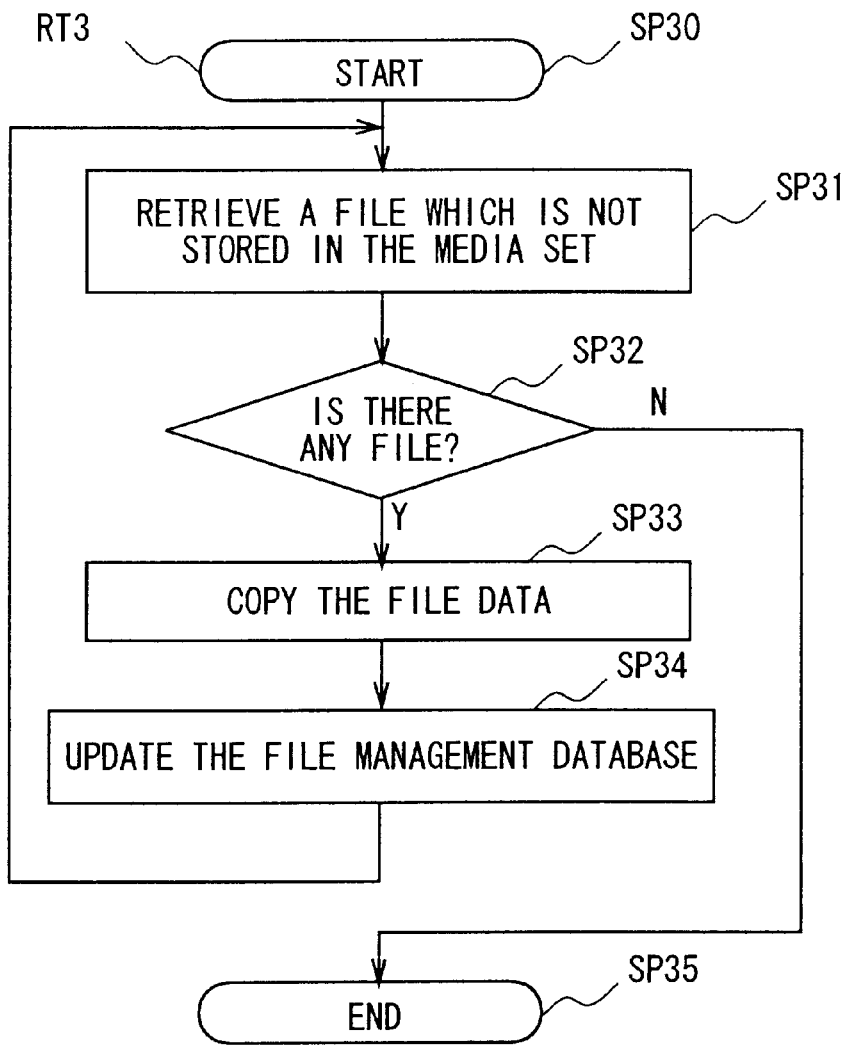
FIG. 8 is a flow chart showing the multiplexing procedure.

Moreover, in the case where the sending out of the file data toward the "media set" has been reserved as stated above, the CPU 15 monitors the operational state of each juke 3 to 5; when such a state has become that writing of the file data onto the removable media which have been assigned to any "media set", the CPU 15 starts a multiplexing procedure RT3 shown in FIG. 8, at the step SP30.

Then, at the following step SP31, the CPU 15 controls the RAID unit 18, so as to read the data of the file management database DB2 (FIG. 4), and then, on the basis of the very file management database DB2, retrieves a file which has been not recorded on the removable media which have been assigned to the object "media set". Besides, the CPU 15 goes to the step SP32 after this, and judges whether the corresponding file exists or not, on the basis of the result of this retrieval.

And, if the affirmative result has been obtained at this step SP32, then the CPU 15 goes to the step SP33, and controls the RAID unit 18 and the needed juke 3 to 5 in a manner so as to cause them to copy the file data of the very file into the removable media which have been assigned to the "media set" that is the object.

In this connection, at this time, the CPU 15 causes them to record also the data on, for instance, a pass name such as a file name and/or a directory name on the RAID unit 18 onto the removable media, so that the data of the "volume pool" can be reconfigured from only the file data which have been recorded onto the removable media.

Moreover, the CPU 15 then goes to the step SP34, and updates the file management database DB2 so as to register the fact that the very file data have been copied into the removable media which have been assigned to the "media set" on the very file management database DB2; the CPU 15 then returns to the step SP31, and repeats the loop of the steps SP31-SP32-SP33-SP34-SP31 until the negative result is obtained at the step SP32.

And, if the negative result has been obtained after all at the step SP32, then the CPU 15 goes to the step SP35 and ends this multiplexing procedure RT3; after this time, the CPU 15 executes the similar processing with respect to the other "media sets" also, so as to cause the removable media which have been assigned to the respective "media sets" to record this file data, respectively.

(1-5) Operation and Effects of the Embodiment

With the above configuration, in this hierarchical storage management system 1, the CPU 15 in the hierarchical storage management unit 2 creates the specified "media set" within the specified "volume pool", in response to the request sent from the client computer 19.

And, in this hierarchical storage management system 1, if file data have been given via the Ethernet 17, then the very file data are once stored within the RAID unit 18 in th hierarchical storage management unit 2; after this, with the stated timing, the very file data are multiplexed in such a manner that the very file data are recorded in the respective removable media which have been assigned to each "media set" which has been already set at that time.

Besides, in the hierarchical storage management system 1, if a command "perform backup" has been given, then a "media set" is newly created as necessary, and, into the removable media which have been assigned to the very "media set", all file data in the corresponding "volume pool" and all management data of the very "volume pool" are recorded, and then the very "media set" is separated through an internal processing.

Therefore, in this hierarchical storage management system 1, it is possible to use the removable media which have been allocated to the very "volume pool", freely allocating them to the use in multiplexing and/or to the use in backup; hence, it is possible to easily perform multiplexing and/or backup of the file data as necessary.

According to the above configuration, the "media set" is set within the "volume pool" in response to the request sent from the exterior, and the file data are stored in each of the "media sets", therefore, multiplexing and/or backup of the file data can be performed easily as necessary; in this way, it is possible to realize a hierarchical storage management system which is capable of improving the utility and/or the function remarkably.

Figure 9:
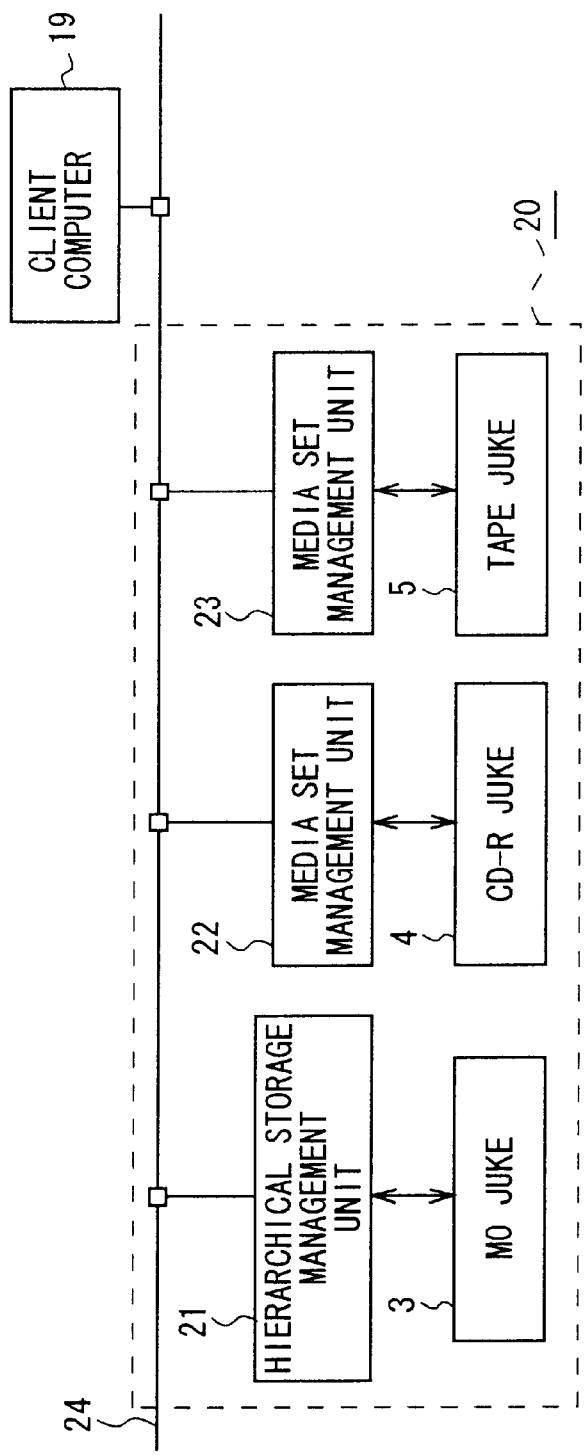
FIG. 9 is a block diagram showing a configuration of the hierarchical storage management system according to the second embodiment.

(2) Second Embodiment (2-1) Configuration of Hierarchical Storage Management System 20 According to Second Embodiment Referring to FIG. 9 which has the same reference numerals as those of FIG. 1 on its portions corresponding to the portions of FIG. 1, a hierarchical storage management system 20 according to the second embodiment is comprised of a hierarchical storage management unit 21 and media set management units 22, 23 consists of micro computers, which have been respectively placed at the physically separated locations and connected via a network 24 such as the internet, wherein the jukes 3 to 5 are respectively connected to the hierarchical storage management unit 21 and to the media set management units 22, 23.

In this case, the hierarchical storage management unit 21 is configured in the same way as the hierarchical storage management unit 2 shown in FIG. 1 except that the contents of the "media set" new creation process and the file data read/write process are not the same.

In practice, when a command "create a "media set" (an alternative set or a backup set) afresh" has been given from a client computer 19, the CPU 25 of the hierarchical storage management unit 21 (FIG. 1) assigns removable media to the "media set" in units of a juke 3 to 5.

Next, the CPU 25 gives a write request of the file data to the corresponding media set management unit 22, 23 via the network 24, and then controls the RAID unit 18 and the juke 3, and/or controls the needed juke 4, 5 which has been connected via the network 24 through the media set management unit 22, 23, in a manner so as to cause them to record all file data recorded on the RAID unit 18 and on the removable media included in the juke 3 to 5 upon the removable media which have been assigned to "media set" newly created, in accordance with the same procedure as what has been described in relation to FIG. 5 and FIG. 6.

On the other hand, when a write request command of the file data has been given from a client computer 19, the CPU 25 takes the very file data in the RAID unit 18 in accordance with the same procedure as what has been described in relation to FIG. 7.

And then, the CPU 25 controls the RAID unit 18 and the juke 3 in a manner so as to cause them to record the very file data upon the removable media (MO disk 3A to 3C) included in the very juke 3, on the other hand, the CPU 25 controls the needed juke 4, 5 connected via the network 24 together with this through the media set management unit 22, 23 in a manner so as to cause them to record the very file data upon the removable media assigned to the alternative set and/or the backup set which have been already set, in accordance with the same procedure as what has been described in relation to FIG. 8.

In contrast with this, if a read-out request command of the file data has been given from the client computer 19 via the network 24, then the CPU 25 controls the RAID unit 18, reads the corresponding file data from the RAID unit 18, and sends this to the client computer 19 via the network 24.

And, if the file data of which the read-out request has been given at this time do not exist in the RAID unit 18, then the CPU 25 controls any one of the jukes 3 to 5 and the RAID unit 18 directly or indirectly via the corresponding media set management unit 22, 23, in a manner so as to cause them to copy the file data which have been recorded in the removable media in the very juke 3 to 5 into the hard disk included in the RAID unit 18, and sends this out to the client computer 19 via the network 24.

In this way, according to this hierarchical storage management system 20, it is possible to effect storage management of the file data hierarchically and to effect multiplexing and backup of the file data as necessary, in the same way as that of the first embodiment.

(2-2) Operation and Effects of the Second Embodiment

With the above configuration, in this hierarchical storage management system 20, the removable media are allocated to each "media set" in units of the juke 3 to 5, which have been respectively placed at the physically separated locations.

Thus, in this hierarchical storage management system 20, multiplexing and creating backup copies of file data are performed, and the file data are retained at the physically separated locations, therefore, it is possible to preclude the fear of a complete loss of the file data due to, for instance, a natural calamity, and to improve the reliability of data retention.

According to the above configuration, the removable media are assigned to each "media set" in units of the juke 3 to 5, which have been respectively placed at the physically separated locations; in this way, it is possible to realize a hierarchical storage management system which has the effect of improving the reliability of data retention, in addition to the effects of the first embodiment.

(3) Other Embodiments

In the above-described first and second embodiments, such a case has been described that the present invention has been applied to the hierarchical storage management system 1 and 20; however, we do not intend to limit the present invention to such. In brief, the invention is widely applicable to an information storage management device for storing and managing information which is supplied.

In the case of the second embodiment, in response to the file read-out request which has been sent from a client computer 19, the hierarchical storage management unit 21 controls the needed juke 3 to 5, reads the corresponding file data, and sends this file data to the client computer 19 (a distributed system). However, alternatively, the hierarchical storage management unit 21 may manage only such data that which file data has been recorded upon which position of which removable media, and may give only the recorded position information to the client computer 19 at the time when the file read-out request has been given from the client computer 19, and, on the basis of the very information, the client computer 19 itself may access the corresponding juke 3 to 5 so as to read the needed file data (a distributed open system).

And, by such an arrangement, at the time of distributing of data such as multi-media contents, the data can be distributed in units of "media set", therefore, it is possible to obtain such effects that lower the cost and improve the network accessibility.

Besides, in the above embodiments, such a case has been described that the removable media such as the MO disks 3A to 3C, the CD-Rs 4A to 4G, and the magnetic tapes 5A to 5E have been applied to, as the recording media for recording information; however, we do not intend to limit the present invention to such; removable media other than MO disks 3A to 3C, CD-Rs 4A to 4G, and magnetic tapes 5A to 5E, as well as recording media other than removable media can be widely applied to.

In the case of the above-mentioned embodiments, the jukes 3 to 5 (properly speaking, recording/reproducing devices, not shown, which have been assigned to the MO disks 3A to 3C, the CD-Rs 4A to 4G, or the magnetic tapes 5A to 5E that have been respectively arranged within each juke 3 to 5) have been applied to, as the writing means for writing file data into the recording media; however, the other wide variety of writing means which are corresponding to the applied recording media may be applied to.

Moreover, in the above embodiments, such a case has been described that the storage area of the "volume pool" which are formed by the removable media included in each juke 3 to 5 has been assigned to each "media set", in units of a separate removable medium; however, we do not intend to limit the present invention to such; for instance, the storage area may be assigned to each "media set" in units of recording surfaces of removable medium or in units of addresses.

Moreover, in the above embodiments, such a case has been described that the CPU 15 for effecting control of entire hierarchical storage management system 1, 20 has been applied to, as the control means for controlling the jukes 3 to 5 in a manner so as to cause them to assign the removable media to each "media set" in response to a request sent from the exterior, and to write the file data in the removable media which have been assigned to each "media set"; however, we do not intend to limit the present invention to such; such control means may be provided aside from the CPU 15.

As described above, according to the present invention, an information storage management device is provided with a control component for dividing the first storage area into the second plural storage areas in response to the first request from the exterior, and for controlling the first writing component so as to write the information in each of the second storage areas. Therefore, multiplexing of information can be performed easily at the time when it is needed. Thus, it is possible to realize an information storage management device in which the utility and the facility can be remarkably improved.

Besides, an information storage management method is provided with the steps of dividing the first storage area into the second plural storage areas in response to the first request from the exterior; and writing information in each of the second storage areas. Therefore, multiplexing of information can be performed easily at the time when it is needed. Thus, it is possible to realize an information storage management method in which the utility and the facility can be remarkably improved.

Furthermore, the control device is provided with controlling component for dividing the first storage area into the second plural storage areas in response to the first request from the exterior; and for controlling the writing component so as to write information in each of the second storage areas. Therefore, multiplexing of information can be performed easily at the time when it is needed. Thus, it is possible to realize a control device capable of improving remarkably the utility and the facility of the information storage management device for storing and managing information.

Moreover, the control method is provided with the steps of ividing the first storage area into the second plural storage areas in response to the first request from the exterior; and controlling the writing component so as to write information in each of the second storage areas. Therefore, multiplexing of information can be performed easily at the time when it is needed. Thus, it is possible to realize a controlling method capable of improving. remarkably the utility and the facility of the information storage management device for storing and managing information.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information storage management device for storing and managing supplied information, the device comprising:
    a writing component for writing the information in a first storage area which is composed of at least one storage medium; and
    a controlling component for dividing the first storage area into a plurality of second storage areas in response to a first external request, and for controlling the writing component so as to write the information in each of the second storage areas.

2. The information storage management device according to claim 1, wherein the controlling component divides the first storage area into the second storage areas in units of the storage medium.

3. The information storage management device according to claim 1, wherein the controlling component separates a specified second storage area through an internal processing, in response to a second external request.

4. The information storage management device according to claim 1, wherein:
    the storage media are placed at a plurality of physically separated locations at which the information can be taken in via a network; and
    the controlling component divides the first storage area into the second storage areas in units of placed location of the storage medium.

5. An information storage management method for storing and managing supplied information, the method comprising the steps of:
    dividing a first storage area which is composed of at least one storage medium into a plurality of second storage areas in response to a first external request; and
    writing the information in each of the second storage areas.

6. The information storage management method according to claim 5, wherein the first storage area is divided into the second storage areas in units of the storage medium.

7. The information storage management method according to claim 5, further comprising the step of separating a specified second storage area through an internal processing, in response to a second external request.

8. The information storage management method according to claim 5, wherein:
    the storage media are placed at a plurality of physically separated locations at which the information can be taken in via a network; and
    the first storage area is divided into the second storage areas in units of placed location of the storage medium.

9. A control device for controlling a writing component for writing supplied information in a first storage area which is composed at least one storage medium, the device comprising a controlling component for dividing the first storage area into a plurality of second storage areas in response to a first external request, and for controlling the writing component so as to write the information in each of the second storage areas.

10. The control device according to claim 9, wherein the controlling component divides the first storage area into the second plural storage areas in units of the storage medium.

11. The control device according to claim 9, wherein the controlling component separates a specified second storage area through an internal processing, in response to a second external request.

12. A control method for controlling a writing component for writing supplied information in a first storage area which is composed of at least one storage medium, the method comprising the steps of:

dividing the first storage area into a plurality of second storage areas in response to a first external request; and controlling the writing component so as to write the information in each of the second storage areas.

13. The control method according to claim 12, wherein the first storage area is divided into the second storage areas in units of the storage medium.

14. The control method according to claim 12, further comprising the step of separating a specified second storage area through an internal processing, in response to a second external request.

* * * * *